US012714900B2

(12) United States Patent
Barson et al.

(10) Patent No.: US 12,714,900 B2
(45) Date of Patent: Aug. 25, 2026

(54) CALIBRATION OF A HEATING ELEMENT IN A FIRE SENSING DEVICE

(71) Applicant: Honeywell International Inc., Charlotte, NC (US)

(72) Inventors: Michael Barson, Nuneaton (GB); Benjamin H. Wolf, Leicester (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 413 days.

(21) Appl. No.: 18/376,120

(22) Filed: Oct. 3, 2023

(65) Prior Publication Data

US 2025/0108243 A1 Apr. 3, 2025

(51) Int. Cl.
*A62C 37/50* (2006.01)
*G08B 29/14* (2006.01)
*G08B 17/107* (2006.01)

(52) U.S. Cl.
CPC ............ *A62C 37/50* (2013.01); *G08B 29/145* (2013.01); *G08B 17/107* (2013.01)

(58) Field of Classification Search
CPC .... A62C 37/50; G08B 29/145; G08B 17/107; G08B 29/24
See application file for complete search history.

(56) References Cited

U.S. PATENT DOCUMENTS 10,624,393 B2 4/2020 Kuczaj
10,701,975 B2 7/2020 Monsees et al.
11,024,154 B1 * 6/2021 Lang ...................... G08B 29/24
11,132,891 B2 9/2021 Dearden et al.
11,227,473 B1 * 1/2022 Griffith ................ G08B 17/107
11,676,466 B2 6/2023 Dearden et al.
2020/0000146 A1 * 1/2020 Anderson ............... A24F 40/70
2021/0065536 A1 3/2021 Dearden et al.
2021/0248901 A1 * 8/2021 Lang ...................... G08B 17/10
2022/0183381 A1 6/2022 Sutton
2022/0183386 A1 6/2022 Sutton

FOREIGN PATENT DOCUMENTS

EP 3859706 A1 8/2021
EP 3958233 A1 * 2/2022 ........... G08B 29/145
RU 2817081 C2 * 4/2024
WO 2020006305 A1 1/2020

* cited by examiner

*Primary Examiner* — Francis C Gray

(74) *Attorney, Agent, or Firm* — Brooks, Cameron & Huebsch, PLLC

(57) ABSTRACT

Devices, methods, and systems for calibration of a heating element in a fire sensing device are described herein. One device includes a heating element, a reservoir comprising liquid or wax, a variable airflow generator, and a controller configured to receive a characteristic of the heating element and apply a calibrated electrical heating input to the heating element based on the characteristic of the heating element. The heating element is configured to heat the liquid or wax to generate a particular amount of aerosol or gas responsive to the calibrated electrical heating input and the variable airflow generator is configured to move the particular amount of aerosol or gas through the fire sensing device and return the fire sensing device to a state prior to generating the particular amount of aerosol or gas.

15 Claims, 5 Drawing Sheets

CALIBRATION OF A HEATING ELEMENT IN A FIRE SENSING DEVICE

TECHNICAL FIELD

The present disclosure relates generally to devices, methods, and systems for calibration of a heating element in a fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

A typical test includes a maintenance engineer using pressurized aerosol to force synthetic smoke into a chamber of a fire sensing device, which can saturate the chamber. In some examples, the maintenance engineer can also use a heat gun to raise the temperature of a heat sensor in a fire sensing device and/or a gas generator to expel carbon monoxide (CO) gas into a fire sensing device. These tests may not accurately mimic the characteristics of a fire and as such, the tests may not accurately determine the ability of a fire sensing device to detect an actual fire.

Also, this process of manually testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fire sensing devices, particularly at a large site. Additionally, it is often the case that many fire sensing devices never get tested because of access issues.

Over time a fire sensing device can become dirty with dust and debris, for example, and become clogged. A clogged fire sensing device can prevent air and/or particles from passing through the fire sensing device to sensors in the fire sensing device, which can prevent a fire sensing device from detecting smoke, fire, and/or carbon monoxide.

DETAILED DESCRIPTION

Figure 1:
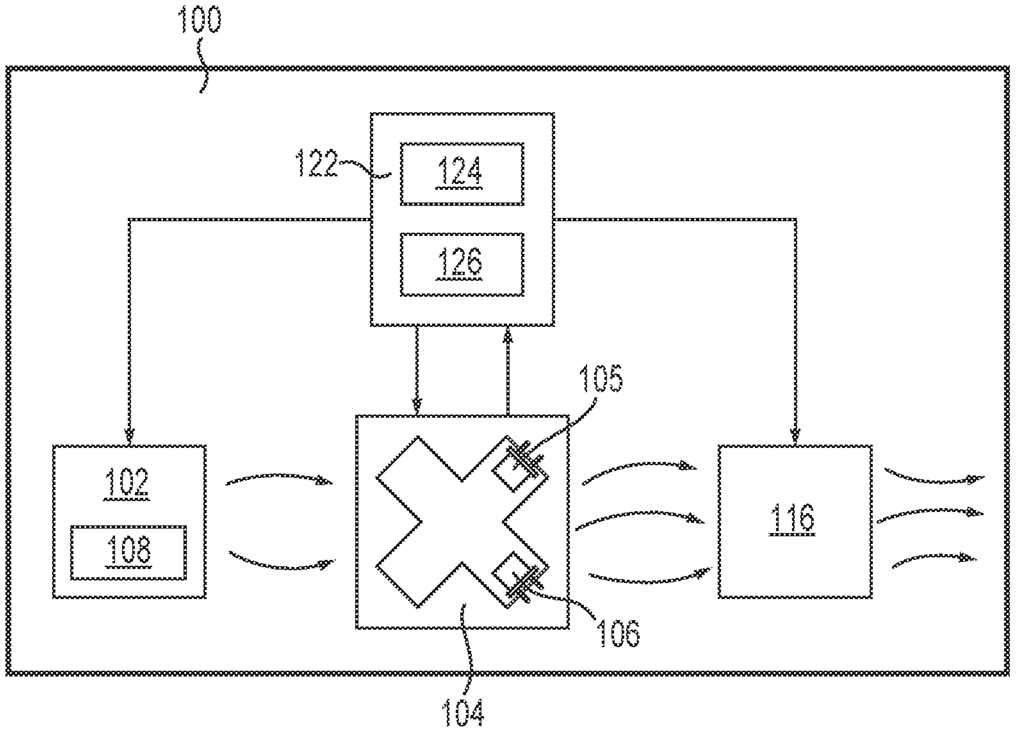
FIG. 1 illustrates a block diagram of a self-test function of a fire sensing device in accordance with an embodiment of the present disclosure.

Devices, methods, and systems for calibration of a heating element in a fire sensing device are described herein. One device includes a heating element, a reservoir comprising liquid or wax, a variable airflow generator, and a controller configured to receive a characteristic of the heating element and apply a calibrated electric heating input to the heating element based on the characteristic of the heating element. The heating element is configured to heat the liquid and/or wax to generate a particular amount of aerosol and/or gas responsive to the calibrated electrical heating input and the variable airflow generator is configured to move the particular amount of aerosol and/or gas through the self-testing fire sensing device and return the self-testing fire sensing device to a state prior to generating the particular amount of aerosol and/or gas.

In contrast to previous fire sensing devices in which a maintenance engineer would have to manually test each fire sensing device in a facility (e.g., using pressurized aerosol, a heat gun, a gas generator, or some combination thereof) to determine whether maintenance of the device is required, fire sensing devices in accordance with the present disclosure can test themselves. Accordingly, a fire sensing device in accordance with the present disclosure may take significantly less maintenance time to test to determine whether maintenance is required, can be tested continuously and/or on demand, and can more accurately determine the ability of the fire sensing device to detect an actual fire. As such, self-testing fire sensing devices may have extended service lives and be replaced less often resulting in a positive environmental impact.

Further, in some fire sensing devices (e.g., self-testing fire sensing devices), wax and/or liquid are heated (e.g., using a heating element) to a particular temperature and/or for a particular amount of time to generate aerosol for testing the functionality of the device. However, in some instances this can generate too little aerosol or too much aerosol due to manufacturing variabilities in the fire sensing device, such as variabilities in the resistance of the heating element, the quantity of coils of the heating element, length of the heating element, diameter of the heating element, and/or wire style of the heating element, among other manufacturing variabilities. However, fire sensing devices in accordance with the present disclosure can account for these manufacturing variabilities and generate a more controlled quantity of aerosol and/or gas by determining and/or using a characteristic of the heating element, to determine how much power to apply to the heating element to heat the wax and/or liquid to generate the required amount of aerosol and/or gas to generate a test fire condition within the fire sensing device. Accordingly, fire sensing devices in accordance with the present disclosure may conduct more accurate self-tests, properly evacuate aerosol and/or gas after a self-test, use less liquid and/or wax to generate the aerosol and/or gas, have lower visible pollution rates per test, reduce wax contamination build-up rate, compensate for manufacturing variables, and/or have better tolerance than previous devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-test function of a fire sensing device 100 (e.g., fire sensing device 100 can be a self-testing fire sensing device) in accordance with an embodiment of the present disclosure. The fire sensing device 100 includes a controller (e.g., microcontroller) 122, an adjustable particle generator 102, an optical scatter chamber 104, and a variable airflow generator 116.

The controller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to calibrate a heating element 108 of fire sensing device 100 in accordance with the present disclosure. For instance, processor 126 can execute the executable instructions stored in memory 124 to receive and/or determine a characteristic, such as, for instance, a resistance, of heating element 108, and apply a calibrated electrical heating input to the heating element 108 based on the characteristic of the heating element 108. The calibrated electrical heating input can be a current, for example.

In a number of embodiments, the controller 122 can apply the calibrated electrical heating input to the heating element 108 of the adjustable particle generator 102 to heat liquid or wax to generate a particular amount of aerosol and/or gas, such as, for instance, a particular amount of aerosol particles. The aerosol particles can be solid or liquid particles in a gas. The particles generated by the adjustable particle generator 102 can be moved (e.g., drawn) through the optical scatter chamber 104 by the variable airflow generator 116 generating airflow and creating a controlled aerosol density level. The particular amount of aerosol and/or gas (e.g., the aerosol density level) can be sufficient to trigger a fire response from fire sensing device 100 without saturating the optical scatter chamber 104. As shown in FIG. 1, the optical scatter chamber 104 can include a transmitter light-emitting diode (LED) 105 and a receiver photodiode 106 to measure the aerosol density level.

In some examples, the controller 122 can determine the characteristic of the heating element 108 by applying a monitoring electrical input to the heating element 108 prior to applying the calibrated electrical heating input to the heating element 108 and measuring an electrical output from the heating element 108 responsive to applying the monitoring electrical input. The monitoring electrical input can be a monitoring current, for example. The characteristic of the heating element 108 can be determined based on the monitoring electrical input and measured electrical output from the heating element 108 and used to determine the calibrated electrical heating input.

Figure 2:
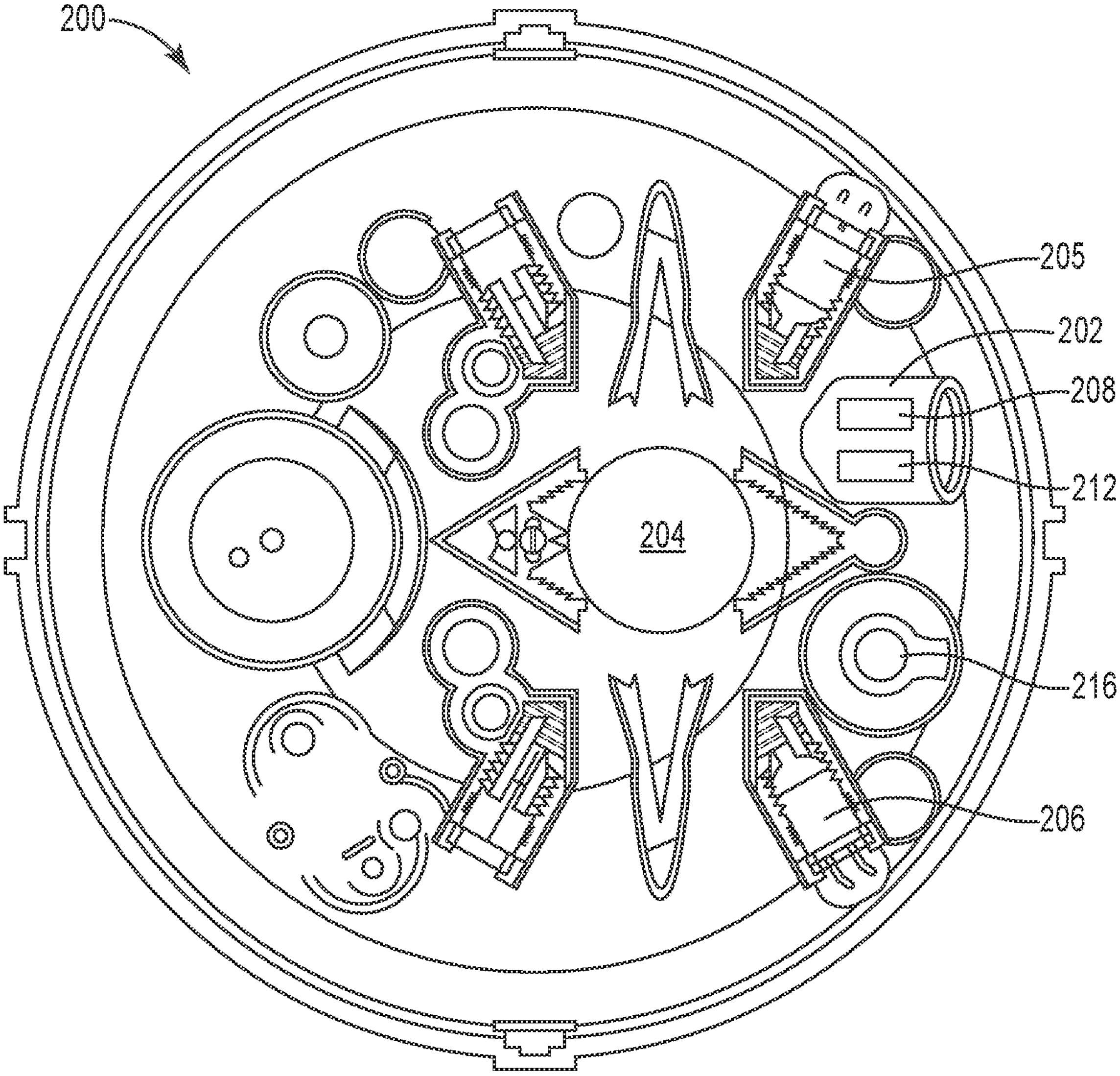
FIG. 2 illustrates an example of a self-testing fire sensing device in accordance with an embodiment of the present disclosure.

FIG. 2 illustrates an example of a self-testing fire sensing device 200 in accordance with an embodiment of the present disclosure. The fire sensing device 200 can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A fire sensing device 200 can automatically or upon command conduct one or more tests contained within the fire sensing device 200. The one or more tests can determine whether the fire sensing device 200 is functioning properly and/or requires maintenance.

As shown in FIG. 2, fire sensing device 200 can include an adjustable particle generator 202, an optical scatter chamber 204 including a transmitter light-emitting diode (LED) 205 and a receiver photodiode 206, a heating element 208, a reservoir 212, and a variable airflow generator 216. In some examples, a fire sensing device 200 can also include a controller including memory and/or a processor, as previously described in connection with FIG. 1.

The heating element 208 of the adjustable particle generator 202, as previously described in connection with FIG. 1, can heat liquid and/or wax contained within the reservoir 212 to generate aerosol particles which can be mixed into a controlled aerosol density level by the variable airflow generator 216. The heating element 208 can be a wire including a resistance wire, for example. In some examples, the heating element 208 can be a coil-shaped wire. A current flowing through the wire can be used to control the temperature of the heating element 208 and further control the number of particles generated by the adjustable particle generator 202. The heating element 208 can be in contact with the liquid and/or wax to heat the liquid and/or wax to create airborne particles to simulate smoke from a fire. The particles can measure approximately 1 micrometer in diameter and/or the particles can be within the sensitivity range of the optical scatter chamber 204.

The heating element 208 can have a number of different characteristics including resistance, coil turns, quantity of coils, length, diameter, material, and/or wire style, among other characteristics, that can vary as a result of variabilities in the manufacture of heating element 208. Such manufacturing variabilities can cause the adjustable particle generator 202 to generate too little aerosol or too much aerosol. Too much aerosol can create odors and/or apparent smoke that can cause anxiety among room inhabitants, while too little aerosol may not be sufficient to generate a test fire condition (e.g., trigger a fire response) during a test of fire sensing device 200. The fire sensing device 200 can create a more controlled quantity of aerosol by determining a resistance of its heating element 208 to determine how much power to apply to the heating element 208 to heat the wax and/or liquid to create the particular amount of aerosol to generate a test fire condition within the fire sensing device 200. In some examples, the resistance of heating element 208 can be determined before each self-test process is run on fire sensing device 200. The resistance can be determined prior to heating the heating element 208, for example.

For example, a monitoring electrical input can be applied to heating element 208. An electrical output can be measured from the heating element 208 responsive to applying the monitoring electrical input to the heating element 208. The monitoring electrical input and/or the electrical output can be a voltage or current, for example. A resistance of the heating element 208 can be determined based on the applied monitoring electrical input and the measured electrical output. For example, the resistance of the heating element can be determined by dividing the electrical output by the monitoring electrical input. Knowing the resistance of the heating element can enable the fire sensing device 200 to produce a known amount of power, which produces a known amount of heat, which produces a known amount of aerosol.

For example, a calibrated electrical heating input can be determined based on the determined resistance of the heating element 208 and applied to the heating element 208 to heat the liquid and/or wax to generate a particular amount of aerosol and/or gas within the fire sensing device 200. In a number of embodiments, the calibrated electrical heating input can be a current or a voltage, which can be determined based on the determined resistance of the heating element 208 and/or a power output of the heating element 208 to consistently heat the heating element 208 to generate a particular amount of aerosol and/or gas. Applying the calibrated electrical heating input to the heating element 208 to heat the liquid and/or wax to generate the particular amount of aerosol and/or gas can be performed as part of a self-test of the fire sensing device 200 to determine whether the fire sensing device 200 is functioning properly or requires maintenance. The heating element 208 can heat the liquid and/or wax to create an aerosol density level sufficient to trigger a fire response from a properly functioning fire sensing device without saturating the optical scatter chamber 204 and/or an aerosol density level sufficient to test a fault condition without triggering a fire response or saturating the optical scatter chamber 204 as part of the self-test.

The variable airflow generator 216 can control the airflow through the fire sensing device 200, including the optical scatter chamber 204. For example, the variable airflow generator 216 can move gases and/or generated aerosol from a first end of the fire sensing device 200 to a second end of the fire sensing device 200. For instance, the variable airflow generator 216 can generate airflow to move the generated aerosol through optical scatter chamber 204. In some examples, the variable airflow generator 216 can be a fan. The variable airflow generator 216 can start responsive to the adjustable particle generator 202 starting. The variable airflow generator 216 can stop responsive to the adjustable particle generator 202 stopping, and/or the variable airflow generator 216 can stop a particular period of time after the adjustable particle generator 202 has stopped.

In a number of embodiments, once the aerosol density level has reached the level sufficient to trigger a fire response, the adjustable particle generator 216 can be turned off and the variable airflow generator 216 can increase the rate of airflow through the optical scatter chamber 204. The variable airflow generator 216 can increase the rate of airflow through the optical scatter chamber 204 to reduce the aerosol density level back to a baseline level. The baseline level can be an initial level of the optical scatter chamber 204 prior to the adjustable particle generator 216 generating particles. For example, the variable airflow generator 216 can remove the aerosol and/or gas from the optical scatter chamber 204 after the measured aerosol density level reaches the level sufficient to trigger a fire response. If the fire sensing device 200 is not blocked or covered, then airflow from the external environment through the optical scatter chamber 204 will cause the aerosol density level to decrease.

The optical scatter chamber 204 can sense the external environment due to a baffle opening in the fire sensing device 200 that allows air and/or smoke from a fire to flow through the fire sensing device 200. The optical scatter chamber 204 can measure the aerosol density level of the generated aerosol.

In a number of embodiments, the measured aerosol density level can be used to determine whether the fire sensing device 200 is functioning properly. For example, the fire sensing device 200 can be determined to be functioning properly based on a comparison of the measured aerosol density level to a threshold aerosol density level, which can be an aerosol density level sufficient to trigger a fire response from the fire sensing device 200 without saturating the optical scatter chamber 204. The fire sensing device 200 can generate a message if the device does not reach the threshold aerosol density level. The fire sensing device 200 can send the message to a monitoring device and/or a mobile device, for example. As an additional example, the fire sensing device 200 can include a user interface that can display the message.

Figure 3:
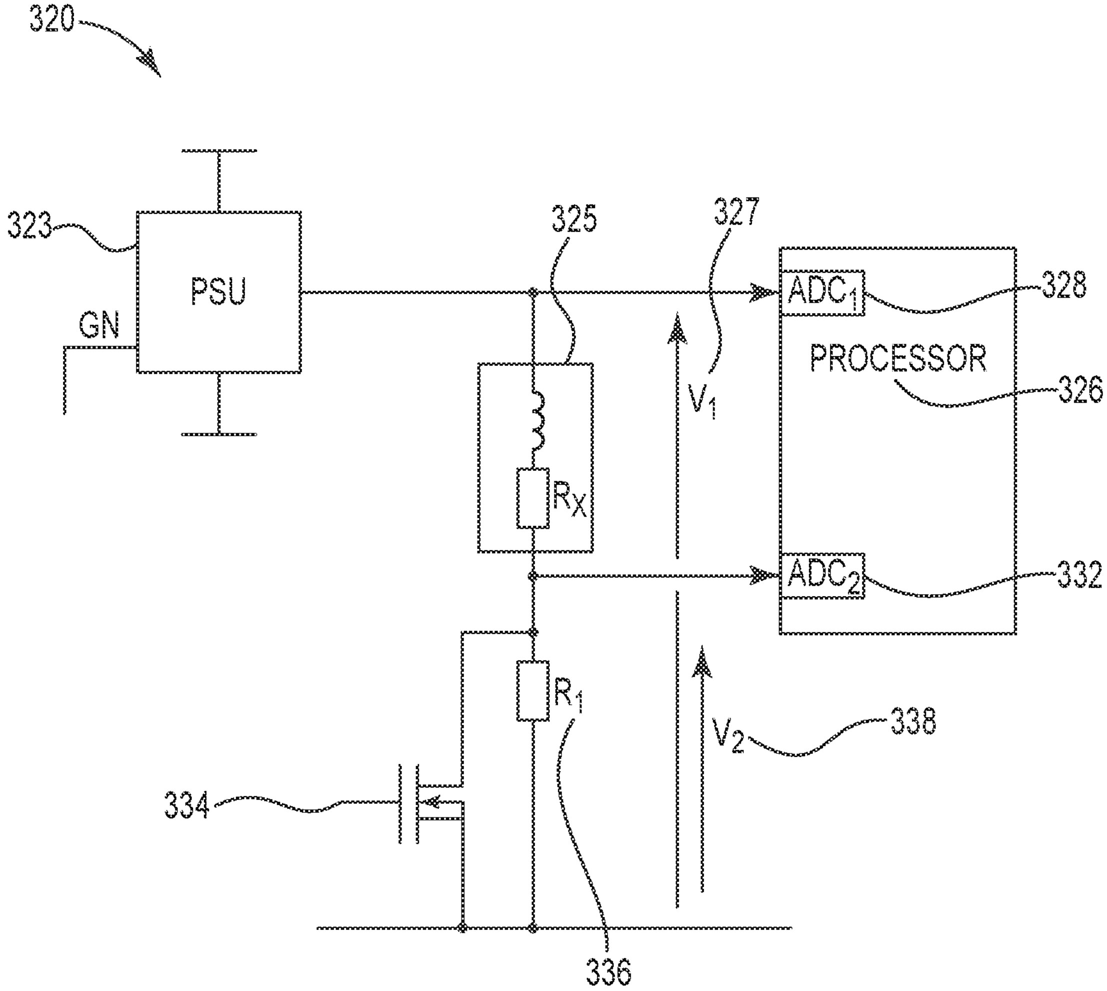
FIG. 3 illustrates an example circuit for calibration of a heating element of a fire sensing device in accordance with an embodiment of the present disclosure.

FIG. 3 illustrates an example circuit 320 for calibration of a heating element (e.g., heating element 108 in FIG. 1 and/or heating element 208 in FIG. 2) of a fire sensing device (e.g., fire sensing device 100 in FIG. 1 and/or fire sensing device 200 in FIG. 2) in accordance with an embodiment of the present disclosure. Circuit 320 can be a low voltage direct current (DC) drive, and can be included in and/or operated by controller 122 previously described in connection with FIG. 1, for instance.

Circuit 320 can be turned on at switch 334. The switch 334 can be a transistor including a metal-oxide-semiconductor field-effect transistor (MOSFET). The circuit 320 can be switched on responsive to the fire sensing device performing a self-test or receiving a command to determine a resistance of the heating element 325.

The circuit 320 can be used to determine (e.g., calculate) the resistance of the heating element 325 by inputting a monitoring electrical input (e.g., a monitoring voltage or monitoring current) via a power supply unit 323 and receiving an electrical output (e.g., an output voltage or output current) coming out of a potential divider (e.g., voltage divider) at processor 326, which can correspond to processor 126 described in connection with FIG. 1. The potential divider can comprise two electrical impedances in series. As illustrated in FIG. 3, the electrical impedances can be a resistance of resistor 336 and the resistance of the heating element 325.

Voltage 338 across the resistance of resistor 336 can be converted from analog to digital via analog to digital converter 332 of processor 326 and voltage 327 across the resistance of the heating element 325 can be converted from analog to digital via analog to digital converter 328 of processor 326. The resistance of the heating element 325 can be calculated by processor 326 using equation 1 below:

$$R_x = R_1\left(\left(\frac{V_1}{V_2}\right) - 1\right) \qquad \text{Equation 1}$$

where Rx is the resistance of the heating element 325, R1 is the resistance of resistor 336, V1 is voltage 327, and V2 is voltage 338.

A calibrated electrical heating input from the power supply unit 323 can be applied to the heating element to heat liquid and/or wax to generate a particular amount of aerosol and/or gas based on the resistance of the heating element 325 using equation 2 below:

$$V_{PSU} = \sqrt{P \times R_x} \qquad \text{Equation 2}$$

where Vpsu is the calibrated electrical heating input from the power supply unit 323, P is a constant power, and $R_x$ is the resistance of the heating element 325.

Equation 1 and Equation 2 can be combined to create equation 3 below:

$$V_{PSU} = \sqrt{P \times \left(R_1\left(\frac{ADC_1}{ADC_2}\right) - 1\right)} \qquad \text{Equation 3}$$

where Vpsu is the calibrated electrical heating input from the power supply unit 323, P is the constant power, R1 is the resistance of resistor 336, ADC1 is the digital conversion of voltage 327, and ADC2 is the digital conversion of voltage 338.

Figure 4:
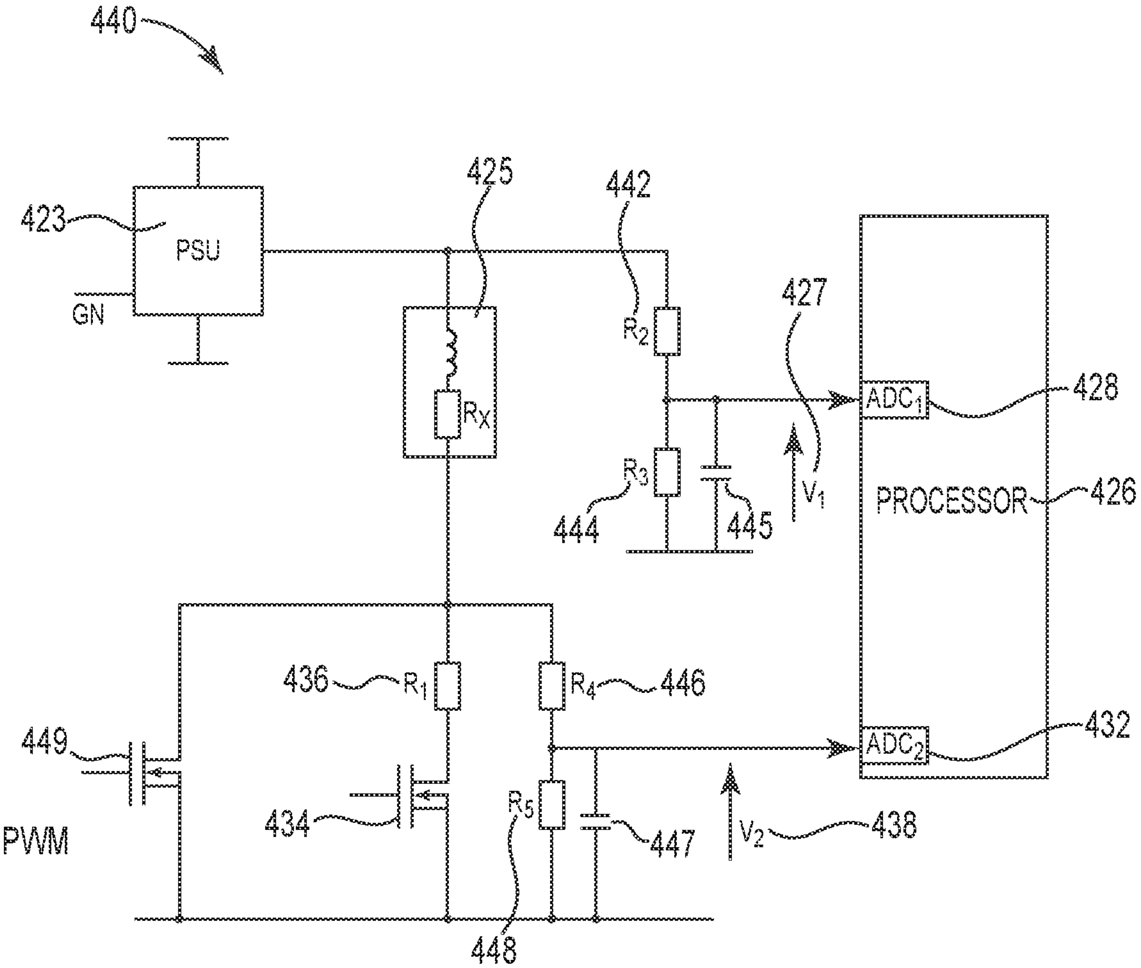
FIG. 4 illustrates an example circuit for calibration of a heating element of a fire sensing device in accordance with an embodiment of the present disclosure.

FIG. 4 illustrates an example circuit 440 for calibration of a heating element (e.g., heating element 108 in FIG. 1 and/or heating element 208 in FIG. 2) of a fire sensing device (e.g., fire sensing device 100 in FIG. 1 and/or fire sensing device 200 in FIG. 2) in accordance with an embodiment of the present disclosure. Circuit 440 can be a high voltage drive with a modulated power supply unit 423, and can be included in and/or operated by controller 122 previously described in connection with FIG. 1, for instance.

Circuit 440 can be turned on at switch 449. The switch 449 can be a transistor including a MOSFET. The circuit 440 can be switched on responsive to the fire sensing device performing a self-test or receiving a command to determine a resistance of the heating element 425.

The circuit 440 can be used to determine (e.g., calculate) the resistance of the heating element 425 by inputting a monitoring electrical input (e.g., a monitoring voltage or monitoring current) via power supply unit 423 and receiving an electrical output (e.g., an output voltage or output current) coming out of a potential divider (e.g., voltage divider) at processor 426, which can correspond to processor 126 described in connection with FIG. 1. The potential divider can comprise two electrical impedances in series. As illustrated in FIG. 4, the electrical impedances can be the resistance of heating element 425 and the resistance of resistor 436 followed by a transistor 434.

Voltage 438 across the resistance of resistor 448 and capacitance of capacitor 447 can be converted from analog to digital via analog to digital converter 432 of processor 426 and voltage 427 across the resistance of resistor 444 and capacitance of capacitor 445 can be converted from analog to digital via analog to digital converter 428 of processor 426. Prior to measuring the voltage 438 across the resistance of resistor 448 and capacitance of capacitor 447, a resistance of resistor 446 can decrease the voltage 438 and prior to measuring the voltage 427 across the resistance of resistor 444 and capacitance of capacitor 445, a resistance of resistor 442 can decrease the voltage 427.

The resistance of the heating element 425 can be calculated by processor 426 using equation 4 below:

$$R_x = \left(\frac{V_1 \times \left(\frac{R_2 + R_3}{R_3}\right)}{V_2 \times \left(\frac{R_4 + R_5}{R_5}\right)} - 1\right) \qquad \text{Equation 4}$$

where Rx is the resistance of the heating element 425, V1 is voltage 427, R2 is the resistance of resistor 442, R3 is the resistance of resistor 444, V2 is voltage 438, R4 is the resistance of resistor 446, and R5 is the resistance of resistor 448.

A pulse width modulation (PWM) of a duty cycle can be the calibrated electrical heating input and can be applied to the heating element to heat liquid and/or wax to generate a particular amount of aerosol and/or gas based on the resistance of the heating element 425 using equation 5 below:

$$D_{PWM} = \left(\frac{P}{V_{PSU}^2}\right) \times R_x \qquad \text{Equation 5}$$

where Dpwm is the pulse width modulation of the duty cycle, P is a constant power, Vpsu is the calibrated electrical heating input from the power supply unit 423, and Rx is the resistance of the heating element 425.

Equation 4 and Equation 5 can be combined to create equation 6 below:

$$D_{PWM} = \left(\frac{P}{V_{PSU}^2}\right) \times \left(\frac{ADC_1 \times \left(\frac{R_2 + R_3}{R_3}\right)}{ADC_2 \times \left(\frac{R_4 + R_5}{R_5}\right)} - 1\right) \qquad \text{Equation 6}$$

where Dpwm is the pulse width modulation of the duty cycle, P is the constant power, Vpsu is the calibrated electrical heating input from the power supply unit 423, ADC1 is the digital conversion of voltage 427, ADC2 is the digital conversion of voltage 438, R2 is the resistance of resistor 442, R3 is the resistance of resistor 444, R4 is the resistance of resistor 446, and R5 is the resistance of resistor 448.

Figure 5:
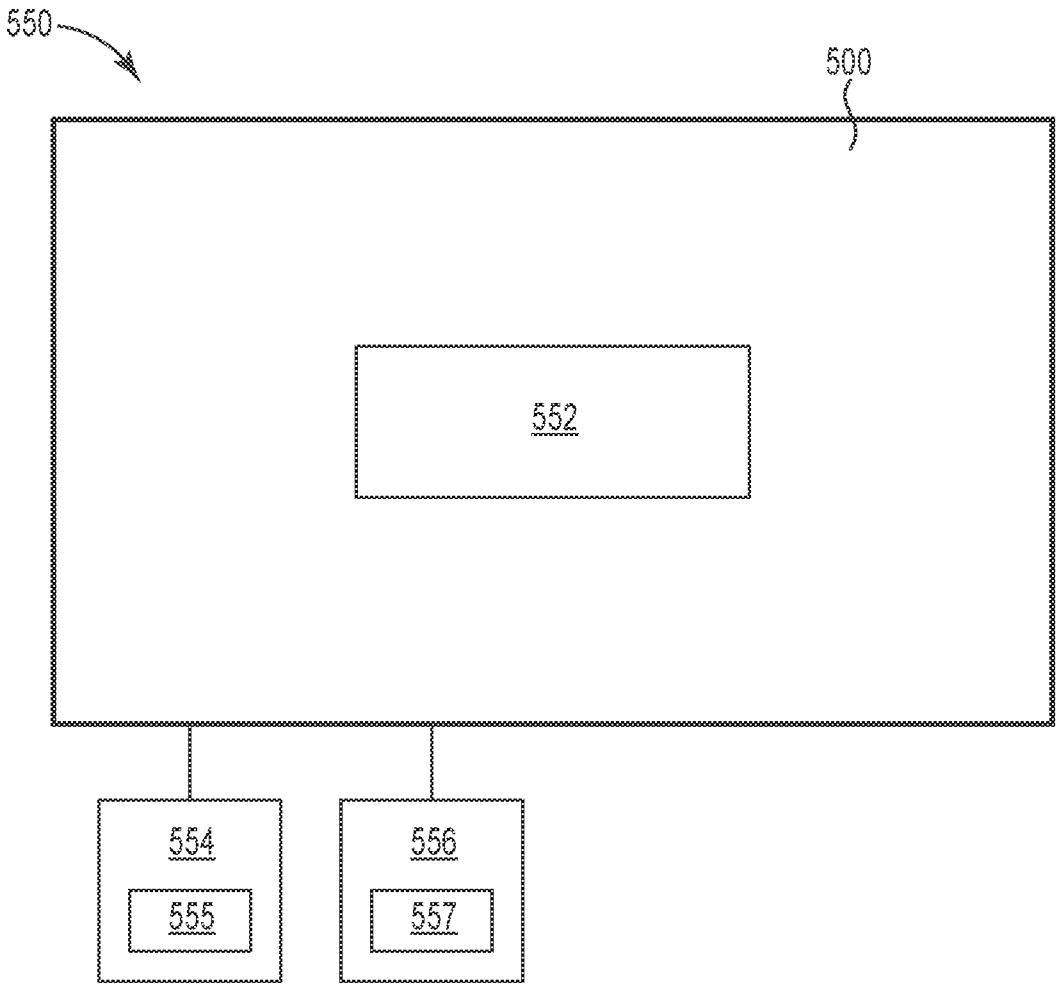
FIG. 5 illustrates a block diagram of a self-test function of a system in accordance with an embodiment of the present disclosure.

FIG. 5 illustrates a block diagram of a self-test function of a system 550 in accordance with an embodiment of the present disclosure. The system 550 can include a fire sensing device 500, a monitoring device 554, and a computing device 556. Fire sensing device 500 can be, for example, fire sensing device 100 and/or 200 previously described in connection with FIGS. 1 and 2, respectively.

The fire sensing device 500 can include a user interface 552. The user interface 552 can be a graphical user interface (GUI) that can provide and/or receive information to and/or from the user, the monitoring device 554, and/or the computing device 556. In some examples, the user interface 552 can display a message. The message can be displayed responsive to the fire sensing device 500 failing to determine a resistance or other characteristic of a heating element (e.g., heating element 108 in FIG. 1 and/or heating element 208 in FIG. 2), for example.

The monitoring device 554 can be a control panel, a fire detection control system, and/or a cloud computing device of a fire alarm system. The monitoring device 554 can be configured to send and/or receive commands and/or messages from a fire sensing device 500 via a wired or wireless network. For example, the monitoring device 554 can transmit a characteristic of the heating element within the fire sensing device 500. For example, the characteristic could be a resistance of the heating element measured during manufacturing of the fire sensing device 500.

The monitoring device 554 can receive messages from a number of fire sensing devices analogous to fire sensing device 500. For example, the monitoring device 554 can receive a message from each of a number of fire sensing devices analogous to fire sensing device 500 and create a ledger of characteristics of the heating element of each respective fire sensing device.

In a number of embodiments, the monitoring device 554 can include a user interface 555. The user interface 555 can be a GUI that can provide and/or receive information to and/or from a user and/or the fire sensing device 500. The user interface 555 can display messages and/or data received from the fire sensing device 500. For example, the user interface 555 can display a message that fire sensing device 500 needs a new heating element, wax, and/or liquid responsive to the fire sensing device 500 failing to create sufficient aerosol and/or gas.

In a number of embodiments, computing device 556 can receive the message from fire sensing device 500 and/or monitoring device 554 via a wired or wireless network. The computing device 556 can be a personal laptop computer, a desktop computer, a mobile device such as a smart phone, a tablet, a wrist-worn device, and/or redundant combinations thereof, among other types of computing devices.

In some examples, a computing device 556 can include a user interface 557 to display messages from the monitoring device 554 and/or the fire sensing device 500. For example, the user interface 557 can display the message. The user interface 557 can be a GUI that can provide and/or receive information to and/or from the user, the monitoring device 554, and/or the fire sensing device 500.

The networks described herein can be a network relationship through which fire sensing device 500, monitoring device 554, and/or computing device 556 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to fire sensing device 500, monitoring device 554, and/or computing device 556 via a wired or wireless network.

As used herein, a "network" can provide a communication system that directly or indirectly links two or more computers and/or peripheral devices and allows a monitoring device 554 and/or a computing device 556 to access data and/or resources on a fire sensing device 500 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A self-testing fire sensing device, comprising:

a heating element;

a reservoir comprising liquid or wax;

a variable airflow generator; and a controller configured to:

receive a characteristic of the heating element, wherein the heating element is a wire, and wherein the characteristic of the heating element is a material of the wire, a length of the wire, or a diameter of the wire that varies as a result of variabilities in manufacturing the heating element; and apply a calibrated electrical heating input to the heating element based on the characteristic of the heating element;

wherein the heating element is configured to heat the liquid or wax to generate a particular amount of aerosol or gas responsive to the calibrated electrical heating input; and wherein the variable airflow generator is configured to:

move the particular amount of aerosol or gas through the self-testing fire sensing device; and return the self-testing fire sensing device to a state prior to generating the particular amount of aerosol or gas.

2. The device of claim 1, wherein the calibrated electrical heating input is a voltage.

3. The device of claim 1, wherein the heating element is a coil-shaped wire.

4. The device of claim 1, wherein the controller is configured to:

apply a monitoring electrical input to the heating element prior to applying the calibrated electrical heating input to the heating element; and measure an electrical output from the heating element responsive to applying the monitoring electrical input.

5. The device of claim 4, wherein the measured electrical output from the heating element is a voltage.

6. A method for operating a self-testing fire sensing device, comprising:

receiving a characteristic of a heating element of a self-testing fire sensing device, wherein the heating element is a wire, and wherein the characteristic of the heating element is a material of the wire, a length of the wire, or a diameter of the wire that varies as a result of variabilities in manufacturing the heating element; and applying a calibrated electrical heating input to the heating element based on the characteristic of the heating element to heat liquid or wax to generate a particular amount of aerosol or gas within the self-testing fire sensing device.

7. The method of claim 6, wherein the calibrated electrical heating input is a current.

8. The method of claim 6, wherein the calibrated electrical heating input is a pulse width modulation of a duty cycle based on a determined resistance of the heating element.

9. The method of claim 6, wherein the method includes determining the calibrated electrical heating input based on a power output of the heating element.

10. The method of claim 6, further comprising performing a test to determine whether the self-testing fire sensing device is functioning properly or requires maintenance subsequent to determining the calibrated electrical heating input and applying the calibrated electrical heating input to the heating element to heat the liquid or the wax to generate the particular amount of aerosol or gas.

11. A self-testing fire sensing device, comprising:

a heating element;

a reservoir comprising liquid or wax;

an optical scatter chamber; and a controller configured to:

receive a characteristic of the heating element, wherein the heating element is a wire, and wherein the characteristic of the heating element is a material of the wire, a length of the wire, or a diameter of the wire that varies as a result of variabilities in manufacturing the heating element;

apply a calibrated electrical heating input to the heating element based on the characteristic of the heating element to heat the liquid or wax to generate a particular amount of aerosol; and measure an aerosol density level of the generated aerosol using the optical scatter chamber.

12. The device of claim 11, further comprising a variable airflow generator configured to generate airflow to move the generated aerosol through the optical scatter chamber.

13. The device of claim 11, wherein the controller is configured to:

compare the measured aerosol density level with a threshold aerosol density level; and determine whether the self-testing fire sensing device is functioning properly responsive to comparing the measured aerosol density level with the threshold aerosol density level.

14. The device of claim 13, wherein the threshold aerosol density level is sufficient to trigger a fire response from the self-testing fire sensing device without saturating the optical scatter chamber.

15. The device of claim 11, wherein the heating element is in contact with the liquid or wax.

* * * * *